(12) United States Patent
Hasegawa et al.

(10) Patent No.: US 11,971,853 B2
(45) Date of Patent: Apr. 30, 2024

(54) OPTIMIZING REMOVABLE MEDIA LIBRARY FILE REMOVAL

(71) Applicant: INTERNATIONAL BUSINESS MACHINES CORPORATION, Armonk, NY (US)

(72) Inventors: Tohru Hasegawa, Tokyo (JP); Hiroshi Itagaki, Yokohama (JP); Tsuyoshi Miyamura, Yokohama (JP); Atsushi Abe, Ebina (JP); Noriko Yamamoto, Tokyo (JP); Shinsuke Mitsuma, Machida (JP)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 17/936,972

(22) Filed: Sep. 30, 2022

(65) Prior Publication Data
US 2024/0111721 A1    Apr. 4, 2024

(51) Int. Cl.
*G06F 16/13* (2019.01)
*G06F 3/06* (2006.01)
*G06F 12/0866* (2016.01)
*G06F 16/16* (2019.01)
*G06F 16/172* (2019.01)
*G06F 12/0817* (2016.01)

(52) U.S. Cl.
CPC .......... *G06F 16/162* (2019.01); *G06F 3/0611* (2013.01); *G06F 3/0686* (2013.01); *G06F 12/0866* (2013.01); *G06F 16/13* (2019.01); *G06F 16/172* (2019.01); *G06F 3/0652* (2013.01); *G06F 12/0817* (2013.01); *G06F 2212/213* (2013.01); *G06F 2212/466* (2013.01)

(58) Field of Classification Search
None
See application file for complete search history.

(56) References Cited

U.S. PATENT DOCUMENTS

| | | | |
|---|---|---|---|
| 7,765,369 B1 * | 7/2010 | Prahlad | G06F 3/065 707/693 |
| 8,832,365 B1 * | 9/2014 | Sims | G06F 16/113 711/111 |
| 2011/0238716 A1 * | 9/2011 | Amir | G06F 3/0643 711/111 |
| 2015/0347022 A1 * | 12/2015 | Ashida | G06F 3/0686 711/113 |
| 2016/0124973 A1 | 5/2016 | Iwanaga | |
| 2018/0018238 A1 * | 1/2018 | Tomii | G06F 16/13 |

(Continued)

OTHER PUBLICATIONS

Anonymous, "Overwriting or erasing a file", IBM Documentation, Last Updated: Mar. 5, 2021, <https://www.ibm.com/docs/en/spectrum-archive-sde/2.4.1.0?topic=tips-overwriting-erasing-file>, 2 pages.

(Continued)

*Primary Examiner* — Nathan Sadler
(74) *Attorney, Agent, or Firm* — Gilbert Harmon, Jr.

(57) ABSTRACT

An approach for deleting a file from a primary file system. The approach deletes a directory entry, associated with a file, from an in-memory index associated with a secondary file system. The approach updates an index cache associated with a secondary file system, based on the in-memory index. The approach updates a dirty flag, associated with the secondary file system, to a value of TRUE.

20 Claims, 2 Drawing Sheets

(56) References Cited

U.S. PATENT DOCUMENTS

2018/0046633 A1     2/2018  Norie
2020/0341694 A1    10/2020  Hasegawa
2021/0303158 A1*    9/2021  Nomura ................ G06F 3/0604

OTHER PUBLICATIONS

Koltsidas et al., "Seamlessly Integrating Disk and Tape in a Multi-tiered Distributed File System", ICDE Conference 2015, pp. 1328-1339.

* cited by examiner

OPTIMIZING REMOVABLE MEDIA
LIBRARY FILE REMOVAL

TECHNICAL FIELD

The present invention relates generally to removable media libraries, and specifically, to optimizing the removal of a file from a removable media library.

BACKGROUND

A Linear Tape File System (LTFS) enables access to files on a removable media, e.g., a tape cartridge, through an interface of a file system. The LTFS is accomplished by storing data on a removable media in an LTFS conforming format, which is defined by open specifications. LTFSs have been implemented by a plurality of vendors such as Oracle, Hewlett-Packard (HP), Quantum and International Business Machines (IBM).

An application capable of using a Hard Disk Drive (HDD) can use an LTFS without modifying the application. However, if the application is intended for the HDD and is operated with the LTFS, the application may experience timeouts accessing a file based on a longer access time associated with an LTFS. This issue is aggravated by an LTFS because access time for accessing a file depends on the position on the tape where the file is stored, e.g., the access time can vary greatly.

In order to prevent such a situation, in some cases it is a practice to configure a hierarchical storage management (HSM) system that does not directly use a file on an LTFS but uses a high-speed storage such as an HDD or an SDD as a primary storage and uses the LTFS as a secondary storage, such as Spectrum Archive Enterprise Edition (hereinafter, LTFS EE) by International Business Machines Corporation (IBM).

In general, the HSM uses an HDD as a primary storage and an application stores a file in the HDD. Then, according to a policy such as "Migration," files that have not been accessed for a fixed time can be moved to an LTFS, which is a secondary storage. Accordingly, when a file is moved from the primary storage to the secondary storage, a file indicative of the presence of the file, generally called a "stub" of the file, is placed on the primary storage. When access to the stub occurs, the contents of the file represented by the stub are moved from the secondary storage to the primary storage to respond to the access. Moving the stub from the secondary storage to the primary storage to respond to the access is known as "Recall."

Problems have been identified with this mechanism based on synchronization of files between the primary storage and the secondary storage related to files deleted by a user in the primary storage remaining in the secondary storage and files updated by a user in the primary storage creating a new copy in the secondary storage while retaining an old copy in the secondary storage. Removing a deleted file or an old copy of a file from the secondary storage requires an unmounting and a mounting of the secondary storage. These problems, based on the time required to remove deleted files or old copies of files from a tape library, generate an accumulation of unnecessary files and their associated indexes resulting in increased time to mount and unmount a tape system. Further, if a secondary storage is not mounted when a file is deleted or updated, then the secondary storage must be mounted, previously deleted files removed, unmounted, and remounted before available for use.

BRIEF SUMMARY

According to an embodiment of the present invention, a computer-implemented method for deleting a file from a primary file system, the computer-implemented method comprising: deleting, by one or more processors, a directory entry, associated with a file, from an in-memory index associated with a secondary file system; updating, by the one or more processors, an index cache associated with the secondary file system, based on the in-memory index; and updating, by the one or more processors, a dirty flag, associated with the secondary file system, to a value of TRUE.

According to an embodiment of the present invention, a computer program product for deleting a file from a primary file system, the computer program product comprising: one or more non-transitory computer readable storage media and program instructions stored on the one or more non-transitory computer readable storage media, the program instructions comprising: program instructions to delete a directory entry, associated with a file, from an in-memory index associated with a secondary file system; program instructions to update an index cache associated with the secondary file system, based on the in-memory index; and program instructions to update a dirty flag, associated with the secondary file system, to a value of TRUE.

According to an embodiment of the present invention, a computer system for deleting a file from a primary file system, the computer system comprising: one or more computer processors; one or more non-transitory computer readable storage media; and program instructions stored on the one or more non-transitory computer readable storage media, the program instructions comprising: program instructions to delete a directory entry, associated with a file, from an in-memory index associated with a secondary file system; program instructions to update an index cache associated with the secondary file system, based on the in-memory index; and program instructions to update a dirty flag, associated with the secondary file system, to a value of TRUE.

Other aspects and embodiments of the present invention will become apparent from the following detailed description, which, when taken in conjunction with the drawings, illustrate by way of example the principles of the invention.

DETAILED DESCRIPTION

Figure 1:
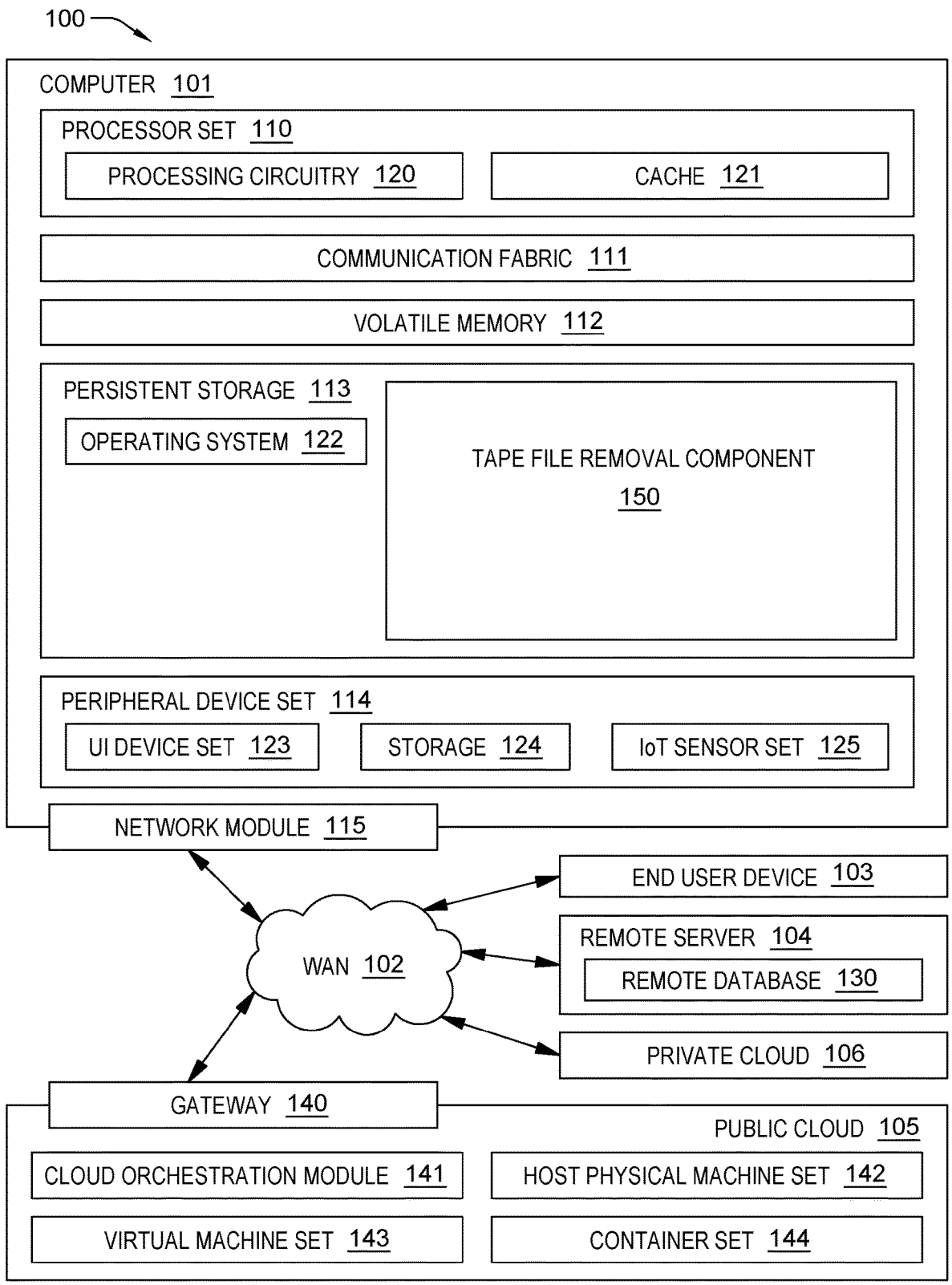
FIG. 1 depicts a cloud computing environment and a high-level architecture, in accordance with at least one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as tape file removal component 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or Open Source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
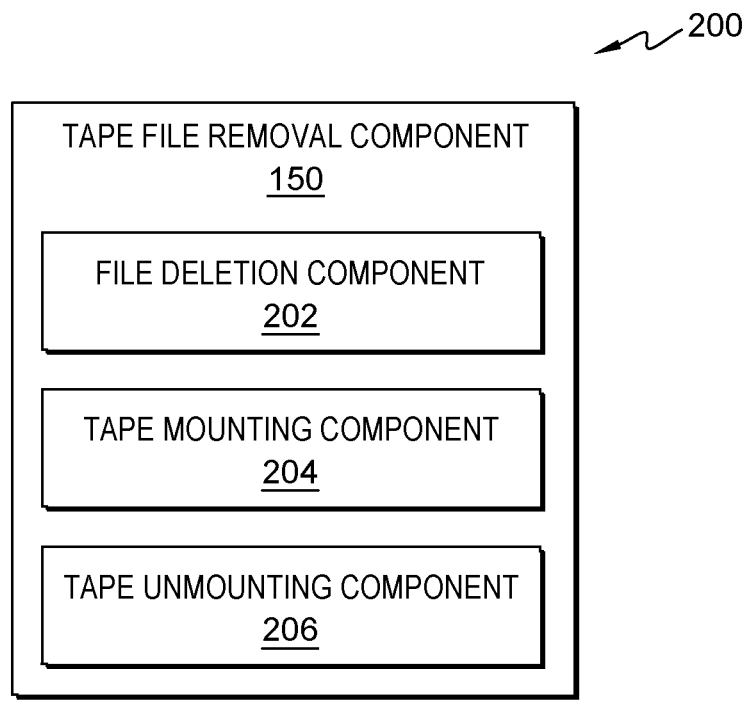
FIG. 2 depicts an exemplary detailed architecture, in accordance with at least one embodiment of the present invention.
Figure 3:
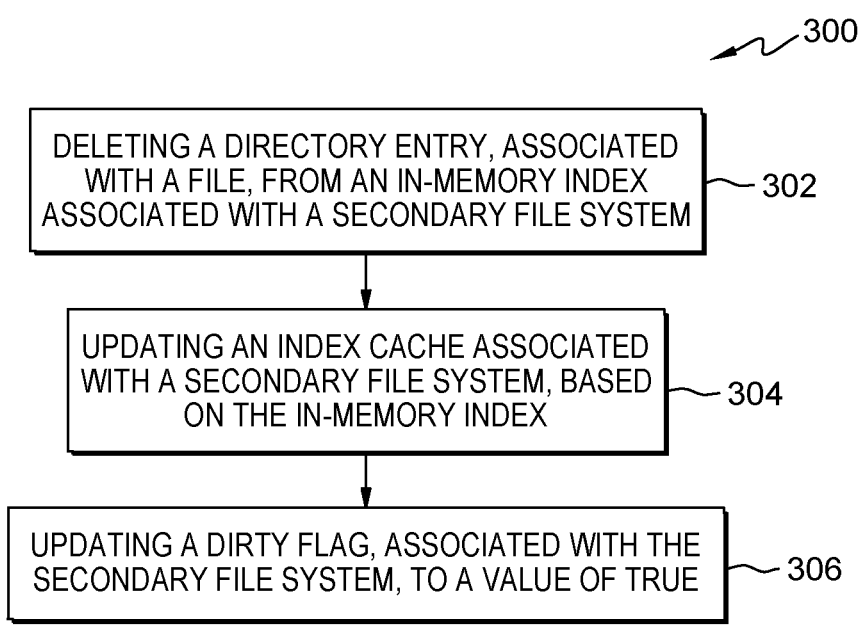
FIG. 3 is a flowchart of a method, in accordance with at least one embodiment of the present invention.

FIG. 2 is an exemplary detailed architecture for performing various operations of FIG. 3, in accordance with various embodiments. The architecture 200 may be implemented in accordance with the present invention in any of the environments depicted in FIGS. 1 and 3, among others, in various embodiments. Of course, more or less elements than those specifically described in FIG. 2 may be included in architecture 200, as would be understood by one of skill in the art upon reading the present descriptions.

Each of the steps of the method 300 (described in further detail below) may be performed by any suitable component of the architecture 200. A processor, e.g., processing circuit(s), chip(s), and/or module(s) implemented in hardware and/or software, and preferably having at least one hardware component, may be utilized in any device to perform one or more steps of the method 300 in the architecture 200. Illustrative processors include, but are not limited to, a central processing unit (CPU), an application specific integrated circuit (ASIC), a field programmable gate array (FPGA), etc., combinations thereof, or any other suitable computing device known in the art.

Architecture 200 provides a detailed view of at least some of the modules of architecture 200. Architecture 200 can comprise a tape file removal component 150, which can further comprise file deletion component 202, tape mounting component 204, and tape unmounting component 206.

In one aspect of an embodiment of the present invention, file deletion component 202 can provide the capability to a primary file system, when a removable media, e.g., tape cartridge, digital video disk (DVD), etc., associated with a secondary file system, associated with a deleted file, is not loaded, to delete the file from the index, in a first memory location and associated with the secondary file system, updating the index cache, stored in second memory location of the primary file system and set a "dirty flag," associated with the secondary file system, to "TRUE."

It should be noted that the index cache, is a copy of an index, stored in the third file system. It should further be noted that at a startup time, the secondary file system can read information to a memory using the index cache of the third file system as a replacement for the index of the secondary file system when the removable media associated with the secondary file system is not loaded if the dirty flag is set to TRUE. Accordingly, the secondary file system can reply to some commands, e.g., a "dir" command or other commands not requiring contents of a file, with information associated with a file without mounting the removable media associated with the secondary file system.

In one aspect of an embodiment of the present invention, tape mounting component 204 can inspect the dirty flag associated with the secondary file system and if the dirty flag is "TRUE," then tape mounting component 204 can mount the removable media associated with the secondary file system, using the index cache, from the third file system, representing the secondary file system instead of the index stored on the removable media. It should be noted that under the described circumstances, changes have occurred to the files on the primary file system but not been reflected in the files stored on the removable media associated with the secondary file system, e.g., deletions, updates, etc., that are not reflected in the index stored on the removable media.

It should be noted that in the index cache of the secondary file system, a file, e.g., a dirty flag file, indicating that only the cache can be updated can be provided by tape mounting component 204. For example, the dirty flag file can be stored for each tape drive with a name such as, but not limited to, <VOLSER>.dirty, appearing as other files for the Index Cache. A character string "TRUE" or "FALSE" can be stored in the dirty flag file, indicating if any changes have been made to the primary file system (TRUE) that are not reflected in the removable media associated with the secondary file system or if the primary file system and the removable media associated with the secondary file system are synchronized (FALSE) with respect to file contents and presence.

In one aspect of an embodiment of the present invention, tape unmounting component 206 can unmount a removable media, based on updating the index on the removable media using the index in memory in the secondary file system before unmounting and if the dirty flag file is set to "TRUE," can set the dirty flag file to "FALSE." It should be noted that embodiments of the present invention can provide, by processing the "index cache"/"index" pair in this fashion, the capability to perform file deletions without mounting the tape drive, and incurring the associated performance penalties.

In another aspect of an embodiment of the present invention, tape unmounting component 206 can inspect meta information of a file deleted from the primary file system and, if a copy of the file is present on the removable media associated with the secondary file system, the copy of the file can be deleted. Accordingly, it can be possible to avoid a situation in which unnecessary files are stored on the removable media associated with the secondary file system, resulting in both increases in the size of the index and the amount of time required to mount the removable media associated with the secondary file system. It should be noted that it can also be possible to make it unnecessary for a user to explicitly perform commands such as a "Reconcile" command.

FIG. 3 is an exemplary flowchart of a method 300 for deleting a file from a primary file system. At step 302, an embodiment can delete, via file deletion component 202, a directory entry, associated with a file, from an in-memory index associated with a secondary file system. At step 304, the embodiment can update, via tape file removal component 150, an index cache associated with the secondary file system, based on the in-memory index. At step 306, the embodiment can update, via tape file removal component 150, a dirty flag, associated with the secondary file system, to a value of TRUE.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for deleting a file from a primary file system, the computer-implemented method comprising:
   deleting, by one or more processors, a directory entry, associated with a file, from an in-memory index associated with a secondary file system;
   updating, by the one or more processors, an index cache associated with the secondary file system, based on the in-memory index; and
   updating, by the one or more processors, a dirty flag, associated with the secondary file system, to a value of TRUE.

2. The computer-implemented method of claim 1, further comprising:
   receiving, by the one or more processors, a command to mount a removable media;
   determining, by the one or more processors, if the dirty flag is TRUE; and
   responsive to the dirty flag being TRUE, mounting, by the one or more processors, the removable media using the in-memory index.

3. The computer-implemented method of claim 1, further comprising:
   receiving a command to unmount a removable media;
   determining, by the one or more processors, if the dirty flag has a value of TRUE;
   responsive to the dirty flag having a value of TRUE, executing actions comprising:
      updating, by the one or more processors, the index on the removable media with the in-memory index associated with the secondary file system;
      unmounting, by the one or more processors, the removable media; and
      updating, by the one or more processors, the dirty flag to a value of FALSE.

4. The computer-implemented method of claim 1, wherein the updating the dirty flag further comprises storing the dirty flag in a dirty flag file, associated with the secondary file system, on a third file system.

5. The computer-implemented method of claim 4, wherein the dirty flag file is named "<VOLSER>.dirty."

6. The computer-implemented method of claim 4, wherein contents of the dirty flag file are a string data type with the value "TRUE" or a string type with the value "FALSE."

7. The computer-implemented method of claim 1, wherein the secondary file system is associated with a removable media.

8. A computer program product for deleting a file from a primary file system, the computer program product comprising:
   one or more non-transitory computer readable storage media and program instructions stored on the one or more non-transitory computer readable storage media, the program instructions comprising:
      program instructions to delete a directory entry, associated with a file, from an in-memory index associated with a secondary file system;
      program instructions to update an index cache associated with the secondary file system, based on the in-memory index; and
      program instructions to update a dirty flag, associated with the secondary file system, to a value of TRUE.

9. The computer program product of claim 8, further comprising:
   program instructions to receive a command to mount a removable media;

program instructions to determine if the dirty flag is TRUE; and responsive to the dirty flag being TRUE, program instructions to mount the removable media using the in-memory index.

10. The computer program product of claim 8, further comprising:

program instructions to receive a command to unmount a removable media;

program instructions to determine if the dirty flag has a value of TRUE;

responsive to the dirty flag having a value of TRUE, executing actions comprising:

program instructions to update the index on the removable media with the in-memory index associated with the secondary file system;

program instructions to unmount the removable media; and program instructions to update the dirty flag to a value of FALSE.

11. The computer program product of claim 8, wherein the program instructions to update the dirty flag further comprises storing the dirty flag in a dirty flag file, associated with the secondary file system, on a third file system.

12. The computer program product of claim 8, wherein the secondary file system is associated with a removable media.

13. The computer program product of claim 11, wherein the dirty flag file is named "<VOLSER>.dirty."

14. The computer program product of claim 11, wherein contents of the dirty flag file are a string data type with the value "TRUE" or a string type with the value "FALSE."

15. A computer system for deleting a file from a primary file system, the computer system comprising:

one or more computer processors;

one or more non-transitory computer readable storage media; and program instructions stored on the one or more non-transitory computer readable storage media, the program instructions comprising:

program instructions to delete a directory entry, associated with a file, from an in-memory index associated with a secondary file system;

program instructions to update an index cache associated with the secondary file system, based on the in-memory index; and program instructions to update a dirty flag, associated with the secondary file system, to a value of TRUE.

16. The computer system of claim 15, further comprising:

program instructions to receive a command to mount a removable media;

program instructions to determine if the dirty flag is TRUE; and responsive to the dirty flag being TRUE, program instructions to mount the removable media using the in-memory index.

17. The computer system of claim 15, further comprising:

program instructions to receive a command to unmount a removable media;

program instructions to determine if the dirty flag has a value of TRUE;

responsive to the dirty flag having a value of TRUE, executing actions comprising:

program instructions to update the index on the removable media with the in-memory index associated with the secondary file system;

program instructions to unmount the removable media; and program instructions to update the dirty flag to a value of FALSE.

18. The computer system of claim 15, wherein the program instructions to update the dirty flag further comprises storing the dirty flag in a dirty flag file, associated with the secondary file system, on a third file system.

19. The computer system of claim 18, wherein the dirty flag file is named "<VOLSER>.dirty" and contents of the dirty flag file are a string data type with the value "TRUE" or a string type with the value "FALSE."

20. The computer system of claim 15, wherein the secondary file system is associated with a removable media.

* * * * *